(12) United States Patent
Kachrani et al.

(10) Patent No.: US 10,257,102 B1
(45) Date of Patent: Apr. 9, 2019

(54) METHODS AND APPARATUS FOR DETECTING A SIGNAL DEGRADATION USING THE PRE-FORWARD ERROR CORRECTION BIT ERROR RATE AT AN OPTICAL TRANSPONDER

(71) Applicant: Juniper Networks, Inc., Sunnyvale, CA (US)

(72) Inventors: Ajay Kachrani, Nashua, NH (US); Manish Talwar, Lunenburg, MA (US); Elmer Tolentino, Livermore, CA (US); Rathi Kartheek, Cupertino, CA (US); Hao Wang, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/720,472

(22) Filed: Sep. 29, 2017

(51) Int. Cl.
*H04L 12/823* (2013.01)
*H04L 1/20* (2006.01)
*H04B 10/40* (2013.01)

(52) U.S. Cl.
CPC ............ *H04L 47/32* (2013.01); *H04B 10/40* (2013.01); *H04L 1/203* (2013.01)

(58) Field of Classification Search
CPC .......... H04L 47/32; H04L 1/203; H04B 10/40
See application file for complete search history.

(56) References Cited

U.S. PATENT DOCUMENTS

| | | | |
|---|---|---|---|
| 9,106,332 B2 | 8/2015 | Zheng | |
| 9,621,421 B1 | 4/2017 | Tolentino et al. | |
| 2005/0125710 A1* | 6/2005 | Sanghvi | G06F 11/0754 714/39 |
| 2009/0199064 A1* | 8/2009 | Radha | H04L 1/0045 714/752 |
| 2010/0027415 A1* | 2/2010 | So | H04L 43/0811 370/225 |

(Continued)

OTHER PUBLICATIONS

Fu, M. et al., "BFD-triggered failure detection and fast reroute for OBS networks," Optical Transmission Systems, Switching, and Subsystems VII, edited by Dominique Chiaroni, Proc. of SPIE-OSA-IEEE Asia Communications and Photonics, SPIE vol. 7632, pp. 76322M-1-76322M-7, 2009.

(Continued)

*Primary Examiner* — Leslie C Pascal
(74) *Attorney, Agent, or Firm* — Cooley LLP

(57) ABSTRACT

In some embodiments, an apparatus comprises an optical transponder which includes a processor, an electrical interface and an optical interface. The processor is operatively coupled to the electrical interface and the optical interface. The optical interface is configured to be operatively coupled to a plurality of optical links and the electrical interface is configured to be operatively coupled to a router such that the optical transponder is configured to be operatively coupled between the plurality of optical links and the router. The processor is configured to perform pre-forward error correction (FEC) bit error rate (BER) detection to identify a degradation of an optical link from the plurality of optical links. The processor is configured to make modifications to packets designated to be transmitted via the optical link in response to the degradation being identified such that the router is notified of the degradation of the optical link.

20 Claims, 5 Drawing Sheets

(56) References Cited

U.S. PATENT DOCUMENTS

2012/0275781 A1* 11/2012 McDonald .......... H04J 14/0283
                                                                    14/283
2018/0109503 A1*  4/2018 Nadas ................. H04L 63/0457
2018/0152469 A1*  5/2018 Smith ................. H04L 63/1433

OTHER PUBLICATIONS

Katz, D. et al., "Bidirectional Forwarding Detection (BFD)," Internet Engineering Task Force (IETF), Request for Comments: 5880, Category: Standards Track, ISSN: 2070-1721, Jun. 2010, 49 pages.

* cited by examiner

METHODS AND APPARATUS FOR DETECTING A SIGNAL DEGRADATION USING THE PRE-FORWARD ERROR CORRECTION BIT ERROR RATE AT AN OPTICAL TRANSPONDER

BACKGROUND

Some embodiments described herein relate generally to methods and apparatus for detecting signal degradation in an optical network. In particular, but not by way of limitation, some embodiments described herein relate to methods and apparatus for detecting a signal degradation using the pre-forward error correction bit error rate at an optical transponder.

With a growing demand of optical communication systems with high data rates capability, it is important to promptly detect and notify signal degradation and failures to satisfy the latency, reliability, and availability requirements of these optical communication systems, which include optical transponders and routers. When an optical transponder fails, known solutions, however, do not allow a router to be promptly notified by the optical transponder with which the router interfaces. As a result, the router is unable to initiate failover procedures promptly in the event of the failure of the optical transponder, which leads to loss of data traffic. Moreover, known solutions may include responding to failures (e.g., reroute data traffic) with a latency after failures occur. These known solutions, however, are typically unable to detect prognostic indicators of a failure, and thus, unable to implement failover procedures before the failure actually occurs.

Accordingly, a need exists for a fast method and apparatus to preventively detect a signal degradation in an optical communication system before a failure occurs, and promptly notify a router of the optical communication system of the failure such that the router initiates failover procedures to avoid or minimize traffic loss.

SUMMARY

In some embodiments, an apparatus comprises an optical transponder that includes a processor, an electrical interface and an optical interface. The processor is operatively coupled to the electrical interface and the optical interface. The optical interface is configured to be operatively coupled to multiple optical links and the electrical interface is configured to be operatively coupled to a router such that the optical transponder is configured to be operatively coupled between the multiple optical links and the router. The processor is configured to perform pre-forward error correction (FEC) bit error rate (BER) detection to identify a degradation of an optical link from the multiple optical links. The processor is configured to make modifications to packets designated to be transmitted via the optical link in response to the degradation being identified such that the router is notified of the degradation of the optical link.

In some embodiments, an apparatus comprises a memory and a processor operatively coupled to the memory. The processor is configured to be operatively coupled to a first optical transponder, which is configured to be operatively coupled to a second optical transponder via multiple optical links. The second optical transponder is configured to be operatively coupled to a remote router. The processor is configured to send first data packets and diagnosis packets to the first optical transponder such that the first optical transponder transmits the data packets to the remote router via the multiple optical links and the second optical transponder. The processor is further configured to receive a signal from the remote router in response to the second optical transponder (1) identifying, via pre-forward error correction (FEC) bit error rate detection, a degradation of a first optical link from the multiple optical links, and (2) dropping a subset of the diagnosis packets. The processor is configured to reroute second data packets in response to the signal such that the remote router receives the second data packets via a second optical link from the multiple optical links.

DETAILED DESCRIPTION

Figure 1:
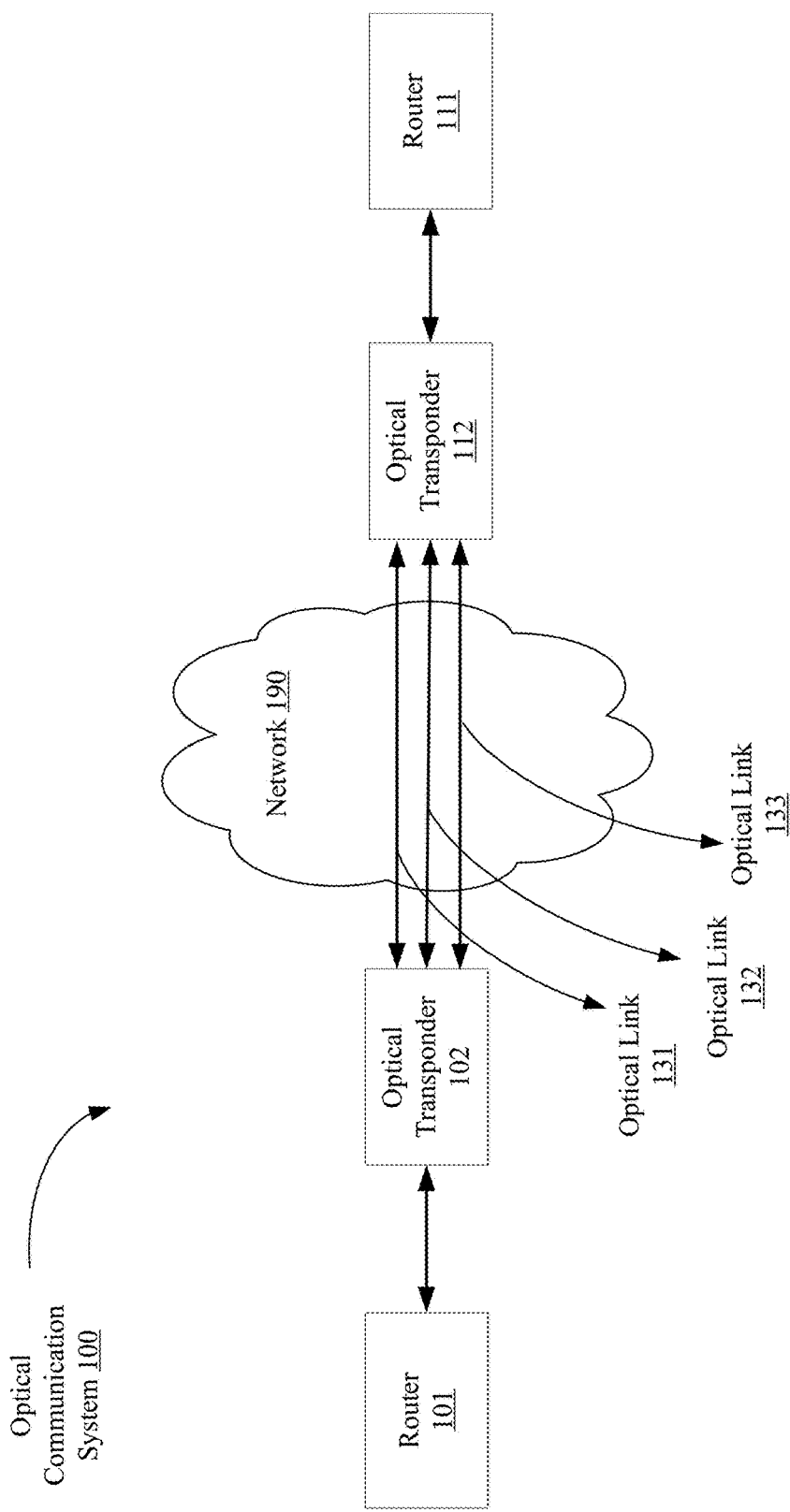
FIG. 1 is a block diagram illustrating an optical communication system, according to an embodiment.

An optical communication system often includes local routers communicating with remote routers via an optical network having optical transponders and a set of optical links. When the optical transponders are not co-located with the routers, known solutions typically do not enable the optical transponders to notify the routers of the condition of the optical links or the optical transponders. As a result, there is often a time delay for the routers to respond to a signal degradation or a failure associated with the optical links or the optical transponders, which leads to loss of data traffic. Some embodiments described herein allow an optical transponder to monitor the condition of an optical link using pre-forward error correction (FEC) bit error rate (BER) value. In response to the detection of a degradation or a failure of the optical link, the optical transponder can notify the local routers and/or the remote routers of the degradation or the failure by making modifications to diagnosis packets, which are communicated between the local routers and the remote routers. Thus, the local routers and the remote routers can initiate failover procedures (e.g., fast reroute (FRR)) to avoid or minimize traffic loss and achieve a high availability of the optical communication system. In some instances, some embodiments described herein allow an availability of 99.9999% of the optical communication system. Moreover, some embodiments described herein allow the optical transponders to detect the degradation of the optical links and therefore notify the routers before the optical links fail. Thus, the routers can respond to the degradation preventively before the optical links fail, and the data traffic can be transmitted in the optical communication system without interruption.

In some embodiments, an apparatus comprises an optical transponder that includes a processor, an electrical interface and an optical interface. The processor is operatively coupled to the electrical interface and the optical interface. The optical interface is configured to be operatively coupled to multiple optical links and the electrical interface is configured to be operatively coupled to a router such that the optical transponder is configured to be operatively coupled between the multiple optical links and the router. The processor is configured to perform pre-forward error correction (FEC) bit error rate (BER) detection to identify a degradation of an optical link from the multiple optical links. The processor is configured to make modifications to packets designated to be transmitted via the optical link in response to the degradation being identified such that the router is notified of the degradation of the optical link.

In some embodiments, an apparatus comprises a memory and a processor operatively coupled to the memory. The processor is configured to be operatively coupled to a first optical transponder, which is configured to be operatively coupled to a second optical transponder via multiple optical links. The second optical transponder is configured to be operatively coupled to a remote router. The processor is configured to send first data packets and diagnosis packets to the first optical transponder such that the first optical transponder transmits the data packets to the remote router via the multiple optical links and the second optical transponder. The processor is further configured to receive a signal from the remote router in response to the second optical transponder (1) identifying, via pre-forward error correction (FEC) bit error rate detection, a degradation of a first optical link from the multiple optical links, and (2) dropping a subset of the diagnosis packets. The processor is configured to reroute second data packets in response to the signal such that the remote router receives the second data packets via a second optical link from the multiple optical links.

As used in this specification, the singular forms "a," "an" and "the" include plural referents unless the context clearly dictates otherwise. Thus, for example, the term "an optical link" is intended to mean a single optical link or multiple optical links. For another example, the term "a bidirectional forwarding detection (BFD) packet" is intended to mean a single BFD packet or multiple BFD packets.

FIG. 1 is a block diagram illustrating an optical communication system, according to an embodiment. The optical communication system 100 can be configured to produce, transmit, and/or receive electrical and optical signals. For example, the optical communication system 100 can be a wavelength division multiplexing (WDM) system, including a dense wavelength division multiplexing (DWDM) system. The optical communication system 100 can include routers 101 and 111, optical transponders 102 and 112, a network 190, and a set of optical links 131-133.

The router 101 can be operatively coupled to the optical transponder 102. The router 111 can be operatively coupled to the optical transponder 112. The router 101 and the router 111 can be structurally and/or functionally similar. The router 101 (and the router 111) can include general-purpose computational engines that can include, for example, processors, memory, and/or one or more network interface devices (e.g., a network interface card (NIC)). The router 101 (and the router 111) can also include a field-programmable gate array (FPGA), an application specific integrated circuit (ASIC), a combination thereof, or other equivalent integrated or discrete logic circuitry. The router 101 (and the router 111) can be networking devices configured to connect at least a portion of a switch fabric system (e.g., a data center or compute devices within the data center; not shown in the figure) to another network (e.g., network 190). Examples of the network 190 include, but are not limited to, a fiber-optic network (e.g., a local area network (LAN), metropolitan area network (MAN), wide area network (WAN), or a long-haul network), or a converged optical network having functionalities of both a wireless network and a wired network.

In some embodiments, for example, the router 101 (and the router 111) can enable communication between components (e.g., peripheral processing devices, portions of the switch fabric; not shown) associated with a switch fabric system. The communication can be defined based on, for example, a layer-3 routing protocol. In some embodiments, the router 101 (and the router 111) can have one or more network interface devices (e.g., 10 Gb Ethernet devices) through which the router 101 (and the router 111) can send electrical signals to and/or receive electrical signals from, for example, a switch fabric and/or other peripheral processing devices. The router 101 can also send electrical signals to and/or receive electrical signals from the optical transponder 102; the router 111 can send electrical signals to and/or receive electrical signals from the optical transponder 112.

The optical transponder 102 can be operatively coupled to the router 101, and operatively coupled to the optical transponder 112 via the set of optical links 131-133. The optical transponder 112 can be operatively coupled to the router 111. The optical transponder 102 and the optical transponder 112 can be structurally and/or functionally similar. The optical transponder 102 (and the optical transponder 112) can be any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, and/or the like. The optical transponder 102 can be configured to receive electrical signals from and/or send electrical signals to the router 101. The optical transponder 102 can receive optical signals from and/or send optical signals to the optical transponder 112 via one or more optical links from the set of optical links 131-133. Similarly, the optical transponder 112 can be configured to receive electrical signals from and/or send electrical signals to the router 111. The optical transponder 112 can receive optical signals from and/or send optical signals to the optical transponder 102 via one or more optical links from the set of optical links 131-133. Details of optical transponder 102 (or optical transponder 112) are discussed herein with regards to FIG. 2.

In some instances, the optical transponder 102 is disaggregated from router 101, i.e., the optical transponder 102 is located separately from router 101. Similarly stated, the optical transponder 102 and the router 101 are not co-located within the same physical device or the equivalent of the same physical device. In some instances, the router 101 can communicate with router 111 without the operational knowledge of the optical transponder 102, the optical transponder 112, and/or the optical links 131-133. For example, when the router 101 transmits a data packet and the router 111 is the destination router (or one of the nodes along the transmission path), the router 101 has the address (e.g., Media Access Control (MAC) address, Internet Protocol (IP) address, and/or the like) of the router 111. The router 101 does not have the address of the optical transponder 102, the optical transponder 112, or the set of optical links 131-133. Similarly, in some instances, the optical transponder 112 is disaggregated from router 111, i.e., the optical transponder 112 is located separately from router 111. Similarly stated, the optical transponder 112 and the router 111 are not co-located within the same physical device or the equivalent of the same physical device. In some instances, the router 111 can communicate with router 101 without the operational knowledge of the optical transponder 112, the optical transponder 102, and/or the optical links 131-133. For example, when the router 111 transmits a data packet and the router 101 is the destination router (or one of the nodes along the transmission path), the router 111 has the address (e.g., Media Access Control (MAC) address, Internet Protocol (IP) address, and/or the like) of the router 101. The router 111 does not have the address of the optical transponder 112, the optical transponder 102, or the set of optical links 131-133.

The set of optical links 131-133 can include a medium capable of carrying optical signals. For example, the set of optical links 131-133 can include a common optical fiber (or multiple optical fibers) that interconnects the optical transponder 102 and the optical transponder 112. In some instances, each optical link from the set of optical links 131-133 can be included in an individual optical fiber. The optical links 131-133 can be included within an optical network that includes other optical links and optical devices (not shown). The number of the optical links 131-133 shown in the figure is for illustration purpose only and can include more or less than three optical links.

The number and arrangement of devices shown in FIG. 1 are provided as an example. In some embodiments, there may be additional devices, fewer devices, different devices, or differently arranged devices than those shown in FIG. 1. For example, the optical communication system 100 can include one or more optical devices (not shown in the figure) operatively coupled to the optical transponders 102 and 112. The one or more optical devices (not shown in the figure) can include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, a combination of the above, and/or another type of device capable of processing and/or transferring optical traffic. The one or more optical devices (not shown in the figure) can process an optical signal and/or transmit an optical signal to another optical device (and/or to optical transponders 102 and 112) via optical links 131-133 or a portion of optical links 131-133.

Figure 2:
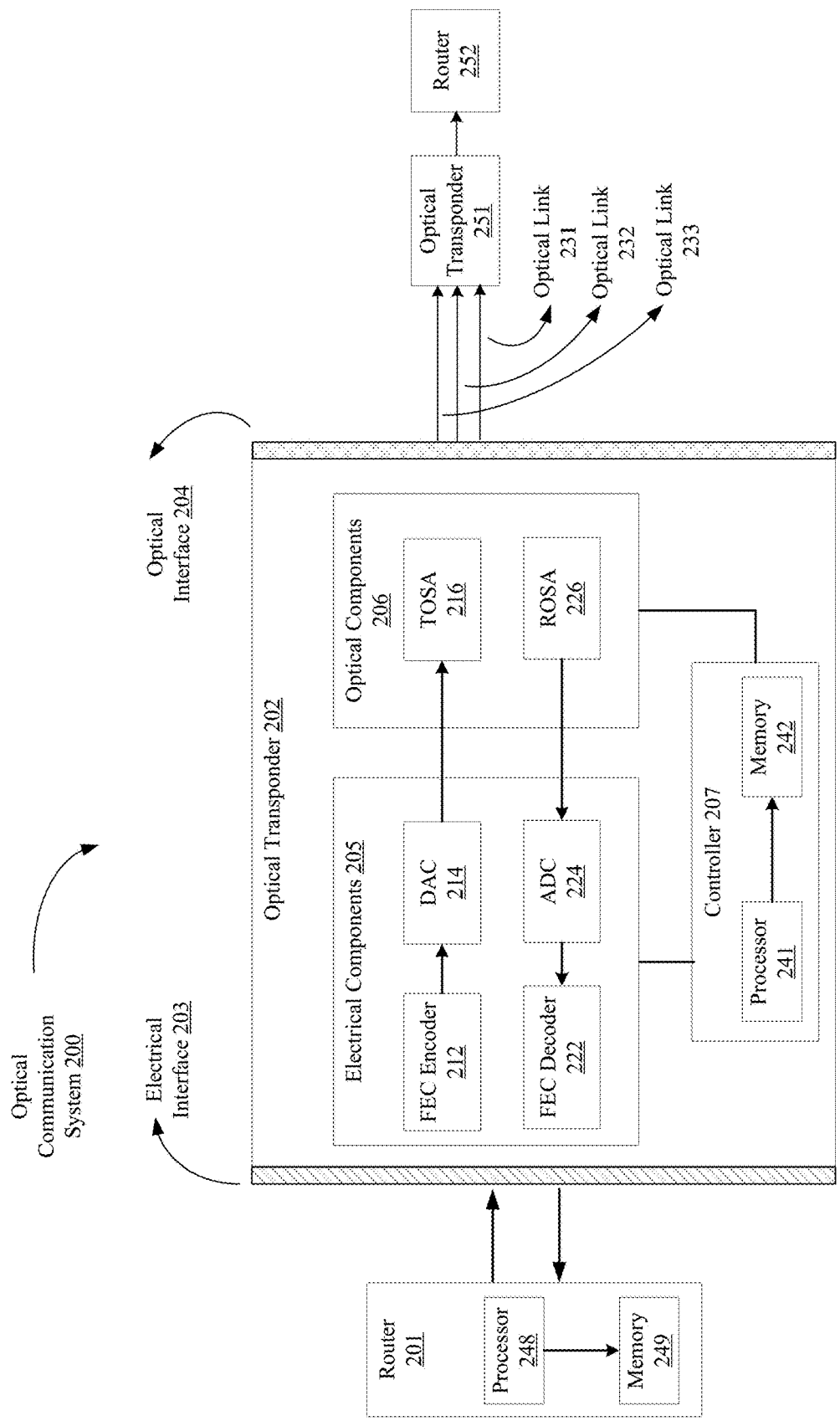
FIG. 2 is a block diagram illustrating an optical communication system, according to an embodiment.

FIG. 2 is a block diagram illustrating an optical communication system, according to an embodiment. The optical communication system 200 can be structurally and/or functionally similar to the optical communication system 100 in FIG. 1. The optical communication system 200 includes routers 201 and 252, optical transponders 202 and 251, and a set of optical links 231-233. The router 201 can be operatively coupled to the optical transponder 202. The optical transponder 202 can be commutatively and/or operatively coupled to the optical transponder 251 via the set of optical links 231-233. The optical transponder 251 can be operatively coupled to the router 252. The optical transponder 202 can be operatively coupled between the set of optical links 231-233 and the router 201. The optical transponder 251 can be operatively coupled between the set of optical links 231-233 and the router 252. The optical transponders 202 and 251 can be structurally and/or functionally similar to the optical transponders 102 and 112 in FIG. 1. The routers 201 and 252 can be structurally and/or functionally similar to the routers 101 and 111 in FIG. 1. The set of optical links 231-233 can be structurally and/or functionally similar to the set of optical links 131-133 in FIG. 1. The optical transponder 202 can be commutatively coupled, via the set of optical links 231-233 to a network (not shown in FIG. 2) similar to the network 190 in FIG. 1.

In some instances, the optical transponder 202 is disaggregated from router 201, i.e., the optical transponder 202 is located separately from router 201. Similarly stated, the optical transponder 202 and the router 201 are not co-located within the same physical device or the equivalent of the same physical device. In some instances, the router 201 can communicate with router 252 without the operational knowledge of the optical transponder 202, the optical transponder 251, and/or the optical links 231-233. For example, when the router 201 transmits a data packet and the router 252 is the destination router (or one of the nodes along the transmission path), the router 201 has the address (e.g., Media Access Control (MAC) address, Internet Protocol (IP) address, and/or the like) of the router 252. The router 201 does not have the address of the optical transponder 202, the optical transponder 251, or the set of optical links 231-233. Similarly, in some instances, the optical transponder 251 is disaggregated from router 252, i.e., the optical transponder 251 is located separately from router 252. Similarly stated, the optical transponder 251 and the router 252 are not co-located within the same physical device or the equivalent of the same physical device. In some instances, the router 251 can communicate with router 252 without the operational knowledge of the optical transponder 251, the optical transponder 202, and/or the optical links 231-233. For example, when the router 252 transmits a data packet and the router 251 is the destination router (or one of the nodes along the transmission path), the router 252 has the address (e.g., Media Access Control (MAC) address, Internet Protocol (IP) address, and/or the like) of the router 251. The router 251 does not have the address of the optical transponder 251, the optical transponder 202, or the set of optical links 231-233.

The router 201 and the router 252 can be structurally and/or functionally similar. The router 201 (and the router 252) can include general-purpose computational engines that can include or be implemented in, for example, processor(s) 248, memory 249, and/or one or more network interface devices (e.g., a network interface card (NIC); not shown in the figure). The router 201 (and the router 252) can also include a field-programmable gate array (FPGA), an application specific integrated circuit (ASIC), a combination thereof, or other equivalent integrated or discrete logic circuitry.

The router 201 can be configured to send diagnosis packets to the router 252 to notify the router 252 of a degradation and/or a failure of one or more components over the transmission path between the router 201 and the router 252. Similarly, the router 252 can be configured to send diagnosis packets to the router 201 to detect and/or notify the router 201 of a degradation and/or a failure of one or more components over the transmission path between the router 252 and the router 201. For example, the router 201 can detect a degradation and/or a failure at the optical transponders 202 or 251, the links between the router 201 and the optical transponder 202, and/or one or more optical links 231-233.

The diagnosis packets can be, for example, bidirectional forwarding detection (BFD) packets, Ethernet Operations, Administration, and Maintenance (E-OAM) packets (e.g., Ethernet connectivity fault management packets, or link fault management packets), and/or the like. The diagnosis packets can be sent between a local node (e.g., router 201) and a remote node (e.g., router 252) at a time interval (e.g., predetermined time intervals, random time intervals, etc.), by a manual request, by an automatic request, and/or in response to meeting a criteria (e.g., the pre-FEC BER value substantially reaching a pre-determined threshold). The nodes (i.e., the router 201 and the router 252) can be configured to support various protocols including, for example, BGP (Border Gateway Protocol), EIGRP (Enhanced Interior Gateway Routing Protocol), IS-IS (Intermediate System-to-Intermediate System), OSPF (Open Shortest Path First), or HSRP (Hot Standby Router Protocol). These protocols detect forwarding path detection failures and allow failure messages to be transmitted.

During an initial BFD session setup, each router defines a BFD control packet, which is sent to the neighbor (peer) router to establish a BFD session. The initial BFD control packet at a first router (e.g., router 201) includes a first field identifying itself (e.g., a media access control (MAC) address of router 201) and a second field identifying a second router (e.g., a MAC address of router 252). Similarly, the initial BFD control packet at a second router (e.g., router 252) includes a first field identifying itself (e.g., a MAC address of router 252) and a second field identifying a second router (e.g., the MAC address of router 201). When router 201 and router 252 both have their own identifiers in each other's BFD control packets, a BFD session between the router 201 and the router 252 is established.

Once a BFD session is created, the local node (e.g., router 201) and the remote node (e.g., router 252) can operate in an asynchronous mode and use an Echo function. For example, diagnosis packets (e.g., Echo packets; also referred herein to as BFD packets) can be sent from the local (originating) node to the remote node, and the remote node can send the diagnosis packets back to the local (originating) node. In some instances, the diagnosis packets that are sent from the remote node back to the local node can be the same diagnosis packets that are sent from the local node to the remote node. In other instances, certain fields (e.g., origination address, destination address, etc.) of the diagnosis packets that are sent from the remote node back to the local node are changed and therefore different from the fields of the diagnosis packets that are sent from the local node to the remote node. In some instances, when a node receives a BFD packet within a detect-timer period, the BFD session remains up and any routing protocol associated with BFD maintains its adjacencies (i.e., the association between the local node and the remote node during the BFD session). If a number of the echoed BFD packets are not received, the BFD session is considered to be down and the local node informs any routing protocols of that BFD session about the failure. The local node reroutes traffic (e.g., initiate a Fast Reroute or convergence process) to bypass the failed link, node, or interface. The local node then sends a failure notification packet to the remote node to notify the remote node of the failure such that the remote node can initiate rerouting traffic (e.g., fast reroute or convergence) without waiting on its slower failure detection to identify the failure.

The router can be configured to include capabilities to execute functions based on fast reroute protocols, which allow rapid recovery in the event of a failure of a network link or a network node. In a network employing Fast Reroute ("FRR") (e.g., a network implementing Multiprotocol Label Switching (MPLS) Traffic Engineering), traffic flowing through a failed link or node is rerouted through one or more preconfigured backup paths. For example, in the event of a degradation or a failure of the optical link 232, the routers 201 and 252 can initiate Fast Reroute and direct traffic to another optical link (e.g., optical link 231) or through optical transponders other than optical transponders 202 and 251.

The processor 248 can be or include any processing device or component configured to perform the data collecting, processing and transmitting functions as described herein. The processor 248 can be configured to, for example, write data into and read data from the memory 249, and execute the instructions stored within the memory 249. Processor 248 can also be configured to execute and/or control, for example, the operations of the memory 249. In some implementations, based on the methods or processes stored within the memory 249, the processor 248 can be configured to execute a router switchover process, as described in FIG. 5.

The memory 249 can be, for example, a random-access memory (RAM) (e.g., a dynamic RAM, a static RAM), a flash memory, a removable memory, and/or so forth. In some embodiments, the memory 249 can include, for example, one or more of a database, process, application, virtual machine, and/or some other software modules (stored and/or executing in hardware) or hardware modules configured to execute a router switchover process. In such implementations, instructions of executing the router switchover process and/or the associated methods can be stored within the memory 249 and executed at the processor 248.

The optical transponder 202 (or the optical transponder 251) can be any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, and/or the like. The optical transponder 202 can be configured to receive electrical signals from and/or send electrical signals to the router 201. The optical transponder 202 can receive optical signals from and/or send optical signals to the optical transponder 251 via one or more optical links from the set of optical links 231-233.

The optical transponder 202 (or the optical transponder 251) can include an electrical interface 203, an optical interface 204, electrical components 205, optical components 206, and a controller 207. The electrical components 205 can include a forward error correction (FEC) encoder 212, a forward error correction (FEC) decoder 222, a digital-to-analog converter (DAC) 214, and an analog-to-digital converter (ADC) 224. The optical components can include a transmit optical sub-assembly (TOSA) 216 and a receiver optical sub-assembly (ROSA) 226. The controller 207 can include a processor 241 and a memory 242. Each component of the optical transponder 202 can be operatively coupled to another component of the optical transponder 202.

The number and arrangement of components shown in FIG. 2 are provided as an example. In some embodiments, there may be additional components, fewer components, different components, or differently arranged components than those shown in FIG. 2. For example, the optical transponder 202 can include a digital signal processor (DSP) (not shown in the figure) which can receive the electrical signals from the FEC encoder and perform appropriate signal processing such as spectral shaping, equalization for optical and electrical impairments, and other such signal processing to ensure that the highest fidelity transmit waveforms with desired characteristics are transmitted into the optical communication system 200. For another example, each component of the optical transponder 202 can access a memory component (e.g., memory 242) and share the use of the memory component.

When the optical transponder 202 transmits traffic from west to east, the FEC encoder 212, the DAC 214, and the TOSA 216 together transmit traffic to the optical transponder 251 via the optical links 231-233. When the optical transponder 202 receives traffic from east to west, the ROSA 226, the ADC 224, and the FEC decoder 222 receive traffic from the optical transponder 252 via the optical links 231-233.

The FEC encoder 212 can be or can include a general purpose processor, a field-programmable gate array (FPGA), an application specific integrated circuit (ASIC), a combination thereof, or other equivalent integrated or discrete logic circuitry. The FEC encoder 212 can also include a memory (e.g., a random-access memory (RAM) (e.g., a dynamic RAM, a static RAM), a flash memory, a removable memory, and/or so forth.) Forward Error Correction (FEC) is a technique for transmitting data such that transmission errors may be minimized. FEC coding redundantly codes each bit to allow a receiving decoder to detect and correct transmission errors. Specifically, for example, the FEC encoder 212 can receive a set of electrical signals (having data signals and/or data packets) from the electrical interface 203 (or from a network processor located upstream (e.g., router 201)), and encodes the set of electrical signals based on a pre-determined algorithm. The FEC encoder 212 can generate FEC overhead bits and add the FEC overhead bits to a payload of an electrical signal. The FEC overhead bits are encoded such that the optical transponder 251 (or the FEC decoder in the optical transponder 251) can use the information within the FEC overhead bits to detect and correct bit errors in the payload of the electrical signal received by the optical transponder 251 after converting the related optical signal. Bit errors may be incurred in the transmission path (e.g., the optical components 206 of the optical transponders 202 or 251, and/or the optical links 231-233) between the optical transponder 202 and optical transponder 251.

The DAC 214 can receive the digital electrical signals from the FEC encoder 212 and convert those signals to analog electrical signals. The analog electrical signals can then be sent to the optical components 206. The DAC 214 can be or can include a general purpose processor, a field-programmable gate array (FPGA), an application specific integrated circuit (ASIC), a combination thereof, or other equivalent integrated or discrete logic circuitry. The DAC 214 can also include a memory (e.g., a random-access memory (RAM) (e.g., a dynamic RAM, a static RAM), a flash memory, a removable memory, and/or so forth.)

The transmit optical sub-assembly (TOSA) 216 includes optical components that receive electrical signals from the DAC 214 and convert these electrical signals into modulated optical signals. For example, the TOSA 216 can modulate an optical source signal with the electrical signals to generate a set of optical signals carrying the information contained in the electrical signals. The TOSA 216 can also include optical sources (e.g., a tunable laser), drivers, modulators, splitters, combiners, attenuators, amplifiers, polarization rotators, power meters, and alike. The TOSA 216 transmits the optical signal to the optical interface 204 which then transmits the optical signals to the network (not shown in the figure; similar to the network 190 as in FIG. 1) via a single optical fiber (or multiple optical fibers). The single optical fiber (or multiple optical fibers) can include one or more optical links 231-233.

The FEC decoder 222 can be configured to correct bit errors in data transmission from the remote router 252 or the optical transponder 251 over the transmission path (e.g., the optical components 206 of the optical transponders 202 or 251, and/or the optical links 231-233) to improve data reliability. The FEC decoder 222 can be or can include a general purpose processor, a field-programmable gate array (FPGA), an application specific integrated circuit (ASIC), a combination thereof, or other equivalent integrated or discrete logic circuitry. The FEC decoder 222 can also include a memory (e.g., a random-access memory (RAM) (e.g., a dynamic RAM, a static RAM), a flash memory, a removable memory, and/or so forth.) The FEC decoder 222 can receive a set of electrical signals, each having a payload together with FEC overhead bits from the ADC 224, and detect and correct bit errors that have occurred over the transmission path, and recover the data information included in the set of electrical signals. In one implementation, the FEC encoder 212 and the FEC decoder 222 can implement quasi-cyclic low-density parity-check (QC-LDPC) codes.

The FEC decoder 222 can be configured to measure the bit error rate (BER), which represents the number of bit errors per unit time. In some instances, in addition to mearing the bit error rate, the FEC decoder 222 can be configured to measure the bit error ratio, which represents the number of bit errors divided by the total number of transferred bits during a time interval. The bit error rate or the bit error ratio can show a degree of errors that has occurred over the transmission path (e.g., the optical components 206 of the optical transponders 202 or 251, and/or the optical links 231-233). The FEC decoder 222 can be configured to measure the BER value before or after the FEC decoder 222 corrects the bit errors. The BER value measured before the FEC decoder 222 corrects the bit errors is referred to as pre-FEC BER value. The pre-FEC BER value can be used as an indication of signal degradation over the transmission path. The signal degradation can occur at one or more optical links (e.g., optical link 232) or anywhere over the transmission path between an optical transmitter or an optical receiver. For example, if data packets are transmitted from the optical transponder 202 to the optical transponder 251, the pre-FEC BER value measured by the FEC decoder (not shown in the figure) at the optical transponder 251 can be an indicator of signal degradation at one or more optical links 231-233 or anywhere between the FEC encoder 212 of the optical transponder 202 and the FEC decoder (not shown in the figure) of the optical transponder 251.

The ADC 224 can receive the analog electrical signals from the optical components 206 and convert those signals to digital electrical signals. The digital electrical signals can then be sent to the FEC decoder 222. The ADC 224 can be or can include a general purpose processor, a field-programmable gate array (FPGA), an application specific integrated circuit (ASIC), a combination thereof, or other equivalent integrated or discrete logic circuitry. The ADC 224 can also include a memory (e.g., a random-access memory (RAM) (e.g., a dynamic RAM, a static RAM), a flash memory, a removable memory, and/or so forth.)

The receiver optical sub-assembly (ROSA) 226 can receive optical signals from the network (not shown in the figure; similar to the network 190 as in FIG. 1) via one or more optical links 231-233 in a single optical fiber (or multiple optical fibers), and convert the optical signals into electrical signals. The ROSA 226 can transmit the electrical signals to the ADC 224. The ROSA 226 can include optical hybrids, photodetectors, transimpedance amplifiers and attenuators, and alike.

The controller 207 can include components and/or circuitry configured to control properties of an optical signal, an electrical signal, and/or send control signals to one or more components of optical transponder 202. For example, controller 207 can send control signals to and thus control properties of one or more components within the electrical components 205 and/or one or more components within the optical components 206. In some instances, controller 207 can send control signals to the electrical components 205 or the optical components 206 such that the electrical components 205 or the optical components 206 drop (or remove) a subset of, a predetermined number of, or the entirety of the diagnosis packets (e.g., BFD packets) that are transmitted between the router 201 and the router 252. In some instances, controller 207 can send control signals to the electrical components 205 or the optical components 206 to generate a copy of the diagnosis packets (e.g., BFD packets) and store the copy of the diagnosis packets (e.g., at the memory 242). In some instances, controller 207 can change the state (Sta) field in the diagnosis packets to "Down" such that the routers 201 and 252 are notified of the failure.

In some implementations, the controller 207 is a hardware device and/or software (executed on a processor and/or stored in memory) external to the optical components 206. In other implementations, controller 207 is a hardware device and/or software (executed on a processor and/or stored in memory) implemented within the optical components 206. The controller 207 can include a processor 241 and a memory 242 operatively coupled to the processor 241. The processor 241 can be or include any processing device or component configured to perform the data collecting, processing and transmitting functions as described herein. The processor 241 can be configured to, for example, write data into and read data from the memory 242, and execute the instructions stored within the memory 242. Processor 241 can also be configured to execute and/or control, for example, the operations of the memory 242. In some implementations, based on the methods or processes stored within the memory 242, the processor 241 can be configured to execute the degradation detection and notification process, as described in FIG. 4.

The memory 242 can be, for example, a random-access memory (RAM) (e.g., a dynamic RAM, a static RAM), a flash memory, a removable memory, and/or so forth. In some embodiments, the memory 242 can include, for example, a database, process, application, virtual machine, and/or some other software modules (stored and/or executing in hardware) or hardware modules configured to execute a degradation detection and notification process as described further herein. In such implementations, instructions of executing the degradation detection and notification process and/or the associated methods can be stored within the memory 242 and executed at the processor 241.

The electrical interface 203 allows the exchange of electrical signals between the router 201 and the optical transponder 202. The electrical interface 203 can include and/or be configured to manage one or multiple electrical ports of the optical transponder 202. In some instances, for example, the electrical interface 203 can include one or more line cards, each of which can include one or more ports (operatively) coupled to devices (e.g., router 201). A port included in the electrical interface 203 can be any entity that can communicate with a coupled device or over a network. In some embodiments, such a port need not necessarily be a hardware port, but can be a virtual port or a port defined by software. In some embodiments, the connections between the electrical interface 203 and the devices in the optical communication system 200 can be implemented via a physical layer using, for example, electrical cables, wireless connections, or other suitable connection means. In some embodiments, the electrical interface 203 can be an Ethernet interface.

The optical interface 204 allows the exchange of optical signals between the optical transponder 202 and the network (not shown in the figure; similar to network 190 in FIG. 1) or optical devices in the optical communication system 200. The optical interface 204 can include and/or be configured to manage one or multiple optical ports of the optical transponder 202.

Each optical link from the set of optical links 231-233 can include a medium capable of carrying optical signals. For example, optical link 231 can include an optical fiber that interconnects optical transponders 202 and 251 via optical ports (not shown) of the optical interface 204 and optical ports of the optical interface (now shown) of the optical transponder 251. The optical link 231 can be included within an optical communication system 200 that includes other optical links and optical devices. The set of optical links 231-233 can carry optical signals with different wavelengths (e.g., colored interface).

In use, the router 201 can send a set of electrical signals (having data packets and diagnosis packets) to the electrical interface 203 of the optical transponder 202. The diagnosis packets can be bidirectional forwarding detection (BFD) packets, Ethernet Operations, Administration, and Maintenance (E-OAM) packets (e.g., Ethernet connectivity fault management packets, or link fault management packets), and/or the like. The diagnosis packets can be sent between the router 201 and the router 252 at a time interval. For example, once a diagnosis session (e.g., a BFD session) is created, the router 201 and router 252 can operate in an asynchronous mode and use an Echo function. For example, diagnosis packets (e.g., Echo packets; also referred herein to as BFD packets) can be sent from the router 201 and the router 252 via the optical transponder 202, the optical links 231-233 and the optical transponder 251, and the router 252 sends the packets back to the router 201 also via the optical transponder 251, the optical links 231-233 and the optical transponder 202, and the router 202. In some instances, the diagnosis packets that are sent from the router 252 to the router 201 can be the same diagnosis packets that are sent from the router 201 to the router 252. In other instances, certain fields (e.g., origination address, destination address, etc.) of the diagnosis packets that are sent from the router 252 back to the router 201 are changed and therefore different from the fields of the diagnosis packets that are sent from the router 201 to the router 252. In some instances, when the router 201 or 252 receives a BFD packet within a detect-timer period, the BFD session remains up and any routing protocol associated with BFD maintains its adjacencies (i.e., the association between the router 201 and the router 252 during the BFD session). If a number of the echoed BFD packets are not received, the BFD session is considered to be down (in operation) and the local router (router 201 or 252) informs any network device using routing protocols and for that BFD session about the interruption of the BFD session.

Upon receiving the set of electrical signals from the electrical interface 203, the FEC encoder 212 can encode the set of electrical signals with FEC overhead bits and send the combination to the DAC 214 to convert to analog electrical signals. TOSA 216 can modulate an optical source signal with the analog electrical signals received from DAC 214 and generate a set of optical signals carrying the information of the data packets and the diagnosis packets. The set of optical signals can be sent through the optical interface 204 to the optical transponder 251 via the set of optical links 231-233. In some instances, some optical signals from the set of optical signals have different wavelengths. Each optical signal from the set of optical signals is transmitted via an optical link from the set of optical links 231-233. Each optical link from the set of optical links is uniquely associated with a wavelength from the set of wavelengths.

In some instances, for example, when an optical link 232 is not functioning normally (e.g., the optical fiber deteriorates), more bit errors may occur when the set of optical signals are transmitted via the optical link 232. Upon receiving the set of optical signals, the ROSA (not shown in the figure; functionally and structurally similar to the ROSA 226) of the optical transponder 251 can convert the set of optical signals to a set of electrical signals (including the data packets and the diagnosis packets) and can send to the ADC (not shown in the figure; functionally and structurally similar to the ADC 224) of the optical transponder 251. The ADC of the optical transponder 251 can convert the set of (analog) electrical signals to a set of digital electrical signals and send to the FEC decoder (not shown in the figure; structurally and functionally similar to the FEC decoder 222) of the optical transponder 251. Upon receiving the set of digital electrical signals, the FEC decoder of the optical transponder 251 can measure the pre-FEC BER value of the set of digital electrical signals before the FEC decoder of the optical transponder 251 corrects the bit errors that have occurred during the transmission of the set of optical signals over the degrading optical link 232. The pre-FEC BER value can be used as an indication of signal degradation over the transmission path. The signal degradation can occur at one or more optical links (e.g., optical link 232) or anywhere over the transmission path between the optical transponder 202 and the optical transponder 251.

When the pre-FEC BER value measured by the FEC decoder of the optical transponder 251 reaches or substantially reaches a pre-determined threshold (i.e., a first threshold), the FEC decoder of the optical transponder 251 can generate a signal indicating that the threshold (or the first threshold) of a signal degradation of the optical link 232 is met. In some instances, the signal can include an identifier of the optical link 232 when the threshold of the signal degradation of the optical link 232 is met. In some instances, the pre-FEC BER value substantially reaches the pre-determined threshold when the pre-FEC BER value is within a certain range of the pre-determined threshold (e.g., within 5% difference of the pre-determined threshold). In some implementations, the pre-determined threshold is adjustable (e.g., by a network administrator.)

In response to the detection of the signal degradation of the optical link 232, the optical transponder 251 (e.g., similar to the processor 241 of the controller 207) can make modifications to the diagnosis packets. In some implementations, the optical transponder 251 (e.g., processor 241 of the controller 207) can drop (or remove) a subset of, a predetermined number of, or the entirety of the diagnosis packets. In other words, the optical transponder 251 can include the set of electrical signals having information associated with the data packets and not having information associated with the diagnosis packets that have been dropped (or having information associated with only a subset of the diagnosis packets that have been dropped). The FEC decoder of the optical transponder 251 can correct the FEC bit errors of the electrical signals to produce a corrected set of electrical signals and send the corrected set of electrical signals to the router 252.

Upon receiving, from the optical transponder 251, the set of electrical signals having information associated with the data packets and not having information associated with the diagnosis packets that have been dropped (or having information associated with only a subset of the diagnosis packets that have been dropped), the router 252 can detect the modifications made to the diagnosis packets. In response, the router 252 can (1) initiate the failure response mechanisms (e.g., reroute traffic, initiate a Fast Reroute or convergence process), (2) modify a field of the diagnosis packets to "Down" indicating that the diagnosis packets have been modified or dropped and in some instances, send the modified diagnosis packets back to the router 201, or (3) a combination of (1) and (2). For example, in the event of a degradation or a failure of the optical link 232, the router 252 can initiate Fast Reroute and direct current and/or future traffic to a different optical link (e.g., optical link 231) or through optical transponders other than optical transponders 202 and 251. In some instances, the router 252 can wait to take actions until the pre-FEC BER value reaches a second threshold (as discussed below with regards to FIG. 3) to initiate the failure response mechanisms.

When the router 252 does not receive the diagnosis packets (or only receives a portion of the diagnosis packets) from the optical transponder 251, the router 252, in response, does not send echoed diagnosis packets back to the router 201. The BFD session between the router 201 and the router 252 is considered to be down, and the router 201 is notified of the signal degradation of the optical link 232 in response to not receiving the echoed diagnosis packets from the router 252. In response, the router 201 can initiate the failure response mechanisms (e.g., reroute traffic, initiate a Fast Reroute or convergence process) to bypass the degrading link 232. In such instances, the router 201 can be notified of the degradation of the optical link 232 sooner than would be the case of solely waiting on its slower failure detection to identify the failure (e.g., a mechanism solely performed at and using information at router 201). In such instances, the notification time of the router 201 (i.e., the time it takes to notify router 201 of the signal degradation) is around the BFD multiplier times the minimum-interval value. The minimum-interval value is the value of the minimum interval, in microseconds, between the received BFD packets less any jitter applied by the transmitting router. When the minimum-interval value is zero, the transmitting system does not receive any periodic BFD packets from the remote system. The BFD multiplier, in some instances, is referred to as the detection time multiplier. The negotiated transmit interval, multiplied by the BFD multiplier, provides the detection time for the receiving system in an asynchronous mode.

In some implementations, instead of making modifications to the diagnosis packets at the optical transponder 251 and waiting for router 252 to detect the modifications of the diagnosis packets, the optical transponder 251 can generate a copy of the diagnosis packets and store the copy of the diagnosis packets at the memory of the optical transponder 251. In response to the detection of the signal degradation of the optical link 232, the optical transponder can change the state (Sta) field in the copy of the diagnosis packets to "Down" and send the copy of the diagnosis packets to the optical transponder 202 and the router 252. The optical transponder 202 can transmit the copy of the diagnosis packets to router 201. Based on the "Down" field of the copy of the diagnosis packets, the router 201 can initiate the failure response mechanisms to bypass the degrading link. In such implementations, the notification time to routers 201 and 252 can be nearly instantaneous (i.e., based on transmission and not requiring additional processing). In such implementations, the BFD session between routers 201 and 252 is not authenticated or with simple authentication. In some instances, the simple authentication can be simple password authentication. In such instances, one or more passwords (with corresponding key identifiers) are configured in each transmitting system and/or each receiving system and one of these passwords or identifier pairs is carried in each BFD packet. The receiving system accepts the packet if the password and the key identifiers match one of the passwords or identifier pairs configured in that receiving system. In some implementations, the optical transponder 251 can make modifications to the diagnosis packets and send to router 252 to notify router 252 of the signal degradation. In the meantime, the optical transponder 251 can also generate a copy of the diagnosis packets, change the state (Sta) field to "Down", and send to router 201 via the optical transponder 202.

By using the pre-FEC BER value as an indicator of a signal degradation of an optical link, routers 201 and 252 can respond (e.g., initiate FRR) before a failure of the optical link actually occurs. Such implementations notify the routers of signal degradation and allow routers to preventively reroute traffic to bypass a degrading link such that traffic loss is avoided or minimized in the event of a failure. In other words, in these implementations, the data traffic can be transmitted in the optical communication system 200 with zero or minimum interruption. Moreover, the optical transponder 251 need not (and does not) send control signals to the routers 252 or 201 to notify the routers 251 and 201 of the signal degradation. Instead, by modifying the diagnosis packets (e.g., dropping BFD packets) based on the pre-FEC BER value, the diagnosis session (e.g., the BFD session) between routers 201 and 252 can be considered and communicated as down. In response to not receiving the diagnosis packets after a time interval, the routers 201 and 252 are notified of the signal degradation and can initiate failure response mechanisms (e.g., FRR).

Figure 3:
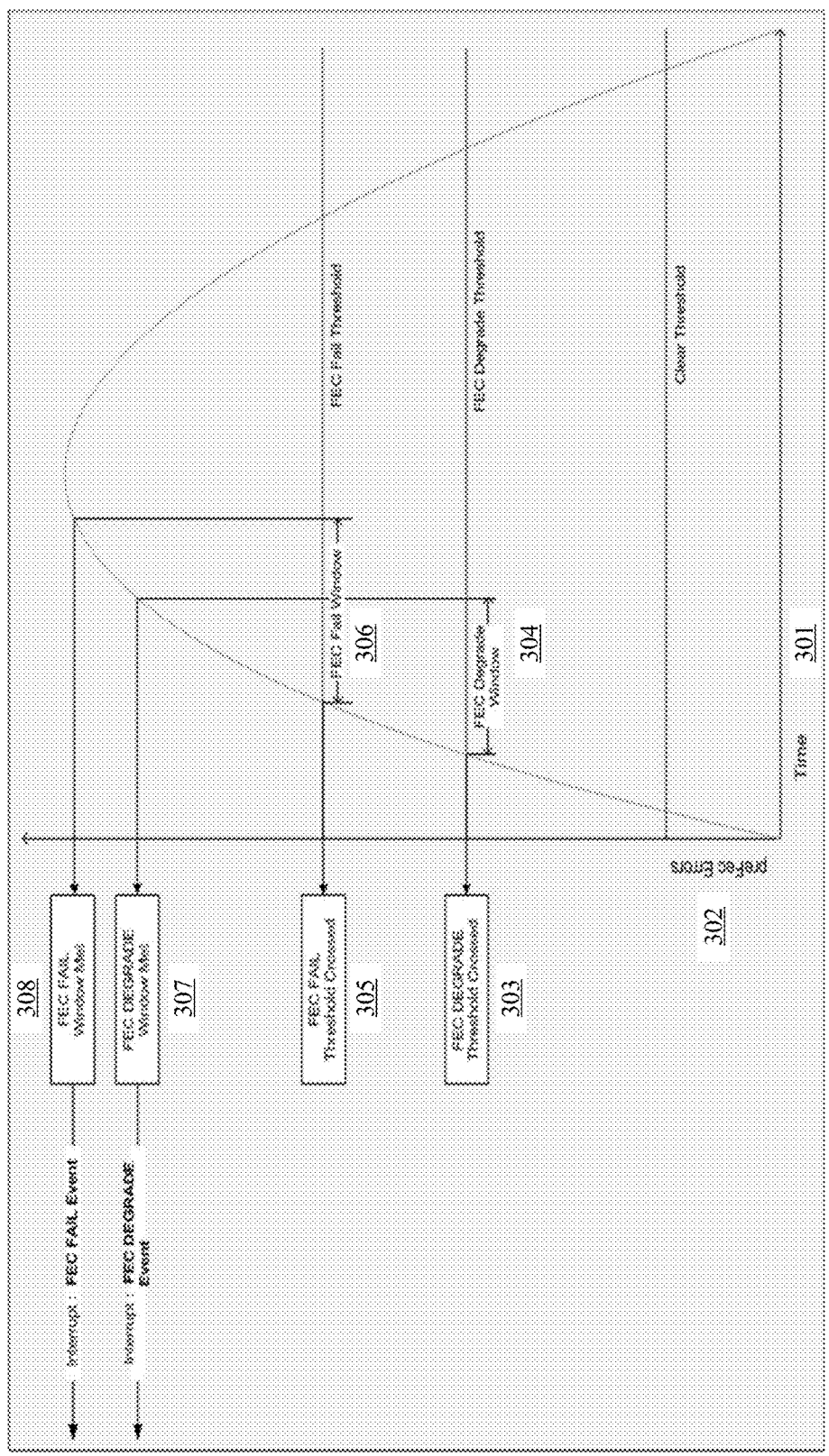
FIG. 3 is a graph illustrating a pre-forward error correction (FEC) bit error rate (BER) value of an optical transponder as a function of time, according to an embodiment.

FIG. 3 is a graph illustrating an example of a pre-FEC BER value 302 of an optical transponder as a function of time 301, according to an embodiment. In some implementations, upon receiving a set of optical signals via a set of optical links (e.g., the set of optical links 231-233 in FIG. 2), an optical transponder (e.g., optical transponder 251 in FIG. 2) can convert the set of optical signals to a set of electrical signals and measure the pre-FEC BER value 302 of the set of electrical signals. The FEC decoder of the optical transponder can measure the pre-FEC BER value before the FEC decoder corrects the bit errors that have occurred during the transmission of the set of optical signals. The pre-FEC BER value 302 can be used as an indication of a signal degradation over the transmission path. The signal degradation can occur at one or more optical links (e.g., optical link 232 in FIG. 2) or anywhere over the path between an optical transmitter and an optical receiver.

In some implementations, user-configurable thresholds (e.g., 303, 305, 307, 308) can be set to trigger notifications of signal degradation and/or failures. For example, when the pre-FEC BER value is substantially below a first threshold 303 (i.e., the FEC degrade threshold), it is considered that the transmission path functions properly and the optical transponder does not trigger any notifications of signal degradation and/or failures. The pre-FEC BER value substantially meets a criteria (e.g., below a threshold, exceeds a threshold, or between a first threshold and a second threshold) when the pre-FEC BER value is within a range of the criteria (e.g., 5% of a first threshold).

When the pre-FEC BER value substantially exceeds the first threshold 303 (e.g., more than 5% of the first threshold), in some implementations, the optical transponder can be set to trigger the notification of signal degradation. When the optical transponder is set to trigger the notification of signal degradation, the optical transponder can make modifications to diagnosis packets (e.g., BFD packets). For example, the optical transponder can drop (or remove) a subset of, a predetermined number of, or the entirety of the diagnosis packets (e.g., BFD packets) that are transmitted between a local router and a remote router (e.g., routers 201 and 252 in FIG. 2). In response to not receiving the diagnosis packets for a period of time, the local router and the remote router can initiate failure response mechanisms (e.g., reroute traffic, initiate a Fast Reroute or convergence process). For another example, the optical transponder can replay the diagnosis packets (e.g., by making a copy of the diagnosis packets and storing these copies at the optical transponder) and change the state (Sta) field in the diagnosis packets to "Down". The optical transponder can then send the modified diagnosis packets to the routers to notify the routers of the signal degradation. In response, the routers can initiate failure response mechanisms.

In some implementations, when the pre-FEC BER value substantially exceeds the first threshold 303, the optical transponder can postpone triggering the notification of signal degradation for a pre-determined period of time (i.e., the FEC degrade window 304). In some instances, the predetermined period of time is user-configurable. When the pre-determine period of time 304 ends and the pre-FEC BER value still exceeds the first threshold 303, the optical transponder can be set to trigger the notification of signal degradation 307. The optical transponder can make modifications to diagnosis packets (e.g., BFD packets), for example, by dropping the diagnosis packets and/or replaying the diagnosis packets and changing the state filed in the diagnosis packets to "Down".

In some implementations, when the pre-FEC BER value substantially exceeds a second threshold 305 (i.e., the FEC FAIL threshold), the optical transponder can be set to trigger the notification of signal failure. In some implementations, the optical transponder can postpone triggering the notification of signal failure for a pre-determined period of time (i.e., the FEC fail window 306). When the pre-determined period of time 306 ends and the pre-FEC BER value still exceeds the second threshold 305, the optical transponder can be set to trigger the notification of signal failure 308.

Figure 4:
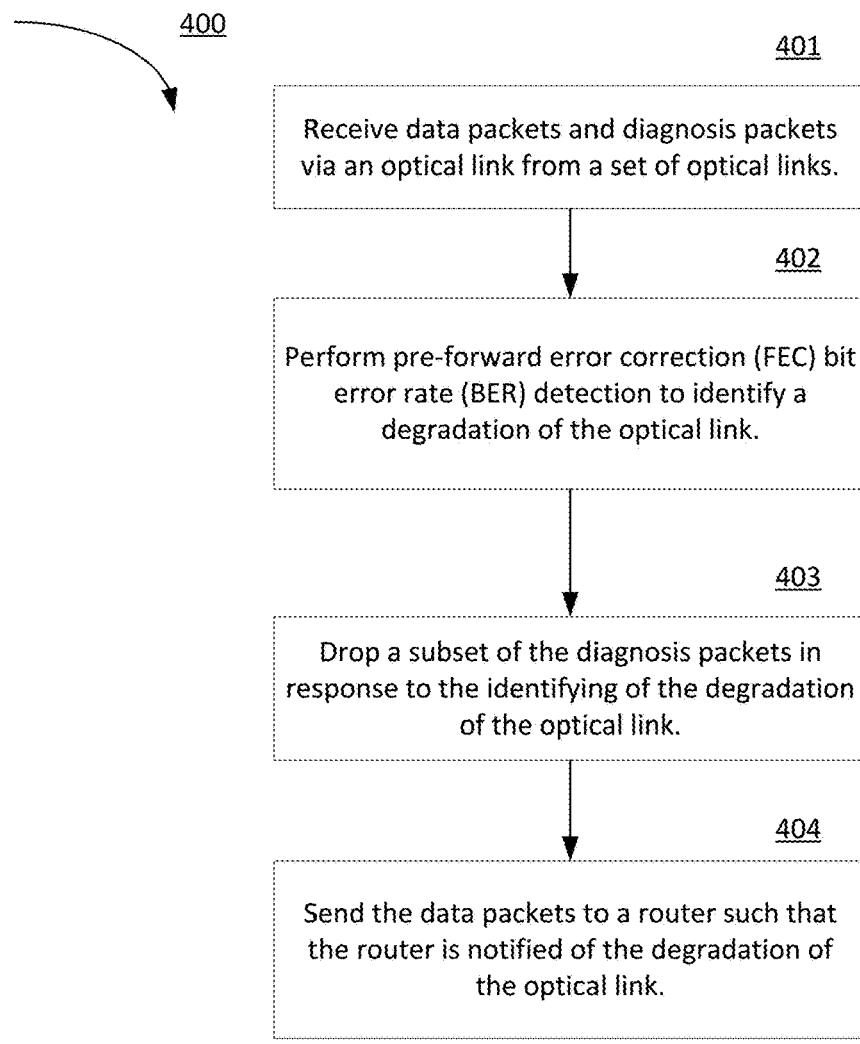
FIG. 4 is a flow chart illustrating a method to detect a degradation by an optical transponder in an optical communication system and notify a router of the degradation, according to an embodiment.

FIG. 4 is a flow chart illustrating a method 400 to detect a degradation by an optical transponder in an optical communication system and notify a router of the degradation, according to an embodiment. The degradation detection and notification method 400 can be executed at, for example, a processor such as the processor 241 of the controller 207 shown and described with respect to FIG. 2.

At 401, an optical transponder in the optical communication system receives data packets and diagnosis packets via an optical link from a set of optical links. The diagnosis packets can be bidirectional forwarding detection (BFD) packets, Ethernet Operations, Administration, and Maintenance (E-OAM) packets (e.g., Ethernet connectivity fault management packets, or link fault management packets), and/or the like. The diagnosis packets can be sent between a local router and a remote router at a time interval. A remote router (e.g., router 201) can send a set of electrical signals (having the data packets and the diagnosis packets) destined for a remote optical transponder (e.g., the optical transponder 202 in FIG. 2), which encodes the set of electrical packets with FEC overhead bits by a FEC encoder to produce a set of encoded electrical packets and converts the set of encoded electrical packets to a set of optical signals.

The set of optical signals are transmitted via a set of optical links (e.g., the set of optical links 231-233 in FIG. 2) to a local optical transponder (e.g., optical transponder 251 in FIG. 2).

At 402, the local optical transponder converts the set of optical signals to a set of electrical signals and performs pre-forward error correction (FEC) bit error rate (BER) detection to identify a degradation of the transmission path that includes the optical link from the set of optical links. A FEC decoder of the local optical transponder can measure, based on the FEC overhead bits, the pre-FEC BER value before the FEC decoder corrects the bit errors that have occurred during the transmission of the set of optical signals over the degrading transmission path that includes optical link of the set of optical links. The pre-FEC BER value can be used as an indication of signal degradation over the transmission path. The signal degradation can occur at one or more optical links or anywhere over the path between the remote optical transponder and the local optical transponder 251.

When the pre-FEC BER value measured by the FEC decoder of the local optical transponder reaches or substantially reaches a pre-determined threshold (i.e., a first threshold), the FEC decoder can generate a signal indicating that the threshold (or the first threshold) of a signal degradation of the optical link is met. In response to the detection of the signal degradation of the optical link, the local optical transponder can make modifications to the diagnosis packets. For example, at 403, the local optical transponder can drop a subset of, a predetermined number of, or the entirety of the diagnosis packets in response to the identifying of the degradation of the optical link.

At 404, the local optical transponder can correct the FEC bit errors and send the corrected set of electrical signals (having the data packets) to a local router (e.g., router 252 in FIG. 2) operatively coupled to the local optical transponder to notify the local router of the degradation of the optical link in response to the dropping of the subset of (or a predetermined number of, or the entirety of) the diagnosis packets. In response, the local router can (1) initiate the failure response mechanisms (e.g., reroute traffic, initiate a Fast Reroute or convergence process), (2) modify a field of the diagnosis packets to "Down" indicating that the diagnosis packets have been modified or dropped and in some instances, send the modified diagnosis packets back to the remote router, or (3) a combination of (1) and (2). For example, in the event of a degradation or a failure of the optical link, the local router can initiate Fast Reroute and direct current and/or future traffic to a different optical link or through optical transponders other than the local optical transponder and the remote optical transponder. In some instances, the local router can wait to take actions until the pre-FEC BER value reaches a second threshold (as discussed with regards to FIG. 3) to initiate the failure response mechanisms.

When the local router does not receive the diagnosis packets (or only receives a subset of the diagnosis packets) from the local optical transponder, the local router, in response, does not send echoed diagnosis packets back to the remote router. The BFD session between the local router and the remote router is considered to be down (in operation) and the remote router is notified of the signal degradation of the optical link in response to not receiving the echoed diagnosis packets from the local router. In response, the remote router can initiate the failure response mechanisms (e.g., reroute traffic, initiate a Fast Reroute or convergence process) to bypass the degrading link. In such instances, the remote router can be notified of the degradation of the optical link sooner than would be the case of solely waiting on its slower failure detection to identify the failure (e.g., a mechanism solely performed at and using information at the remote router).

Figure 5:
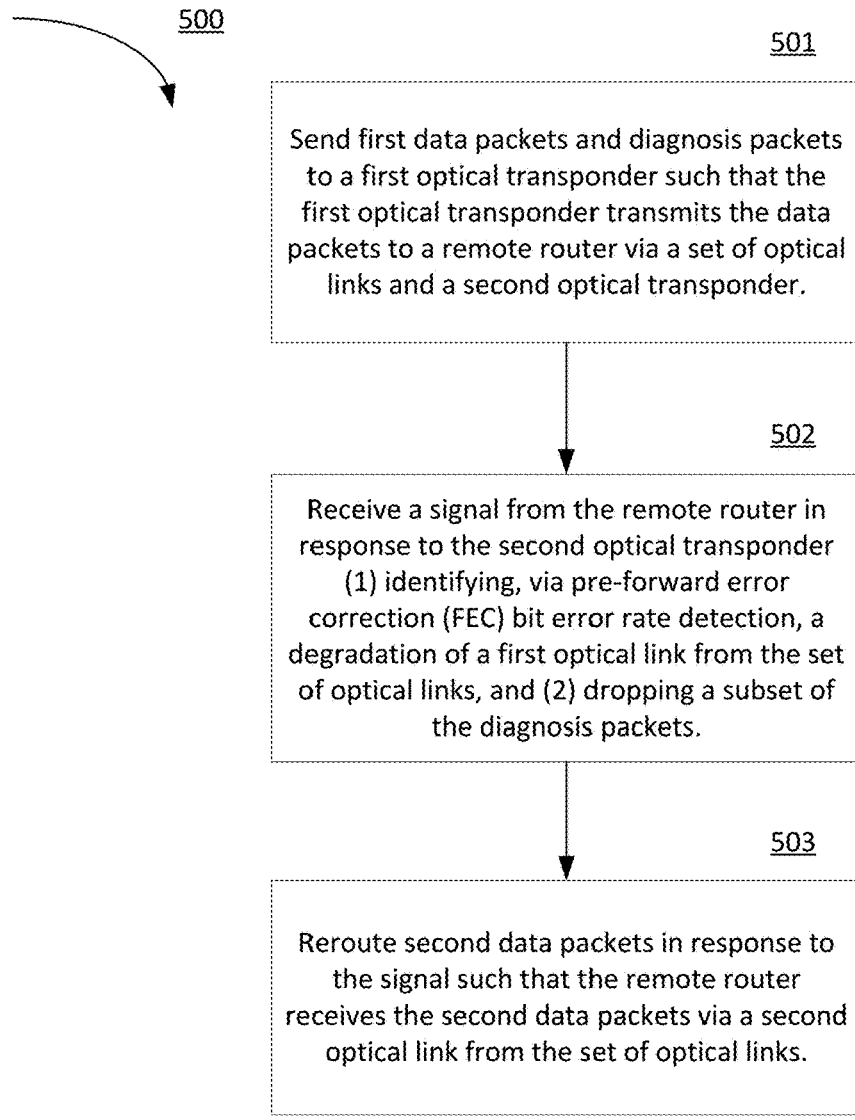
FIG. 5 is a flow chart illustrating a method to perform a router switchover process in response to a notification of a degradation, according to an embodiment.

FIG. 5 is a flow chart illustrating a method 500 to perform a router switchover process in response to a notification of a degradation, according to an embodiment. The router switchover process 500 can be executed at, for example, a processor such as the processor 248 of the router 201 shown and described with respect to FIG. 2.

At 501, the method includes sending first data packets and diagnosis packets from a local router (e.g., router 201 in FIG. 2) to a first optical transponder (e.g., optical transponder 202 in FIG. 2) such that the first optical transponder transmits the data packets to a remote router (e.g., router 252 in FIG. 2) via a set of optical links and a second optical transponder. At 502, the method includes receiving, at the local router, a signal from the remote router in response to the second optical transponder (1) identifying, via pre-forward error correction (FEC) bit error rate detection, a degradation of a first optical link from the set of optical links, and (2) dropping a subset or the entirety of the diagnosis packets. At 503, the method includes rerouting second data packets in response to the signal such that the remote router receives the second data packets via a second optical link from the set of optical links. The second optical link is different from the first optical link.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools.

Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
an optical transponder including a processor, an electrical interface and an optical interface, the processor operatively coupled to the electrical interface and the optical interface, the optical interface configured to be operatively coupled to a plurality of optical links and the electrical interface configured to be operatively coupled to a router such that the optical transponder is configured to be operatively coupled between the plurality of optical links and the router,
the processor configured to receive data packets and diagnosis packets via an optical link from the plurality of optical links,
the processor configured to perform pre-forward error correction (FEC) bit error rate (BER) detection to identify a degradation of the optical link from the plurality of optical links,
the processor configured to make modifications to the diagnosis packets designated to be transmitted via the optical link in response to the degradation being identified such that the router is notified of the degradation of the optical link.

2. The apparatus of claim 1, wherein the diagnosis packets are bidirectional forwarding detection (BFD) packets.

3. The apparatus of claim 1, wherein the modifications to the diagnosis packets include dropping the diagnosis packets such that the router is notified of the degradation of the optical link in response to the diagnosis packets being dropped.

4. The apparatus of claim 1, wherein the modifications to the diagnosis packets include dropping a predetermined number of the diagnosis packets such that the router is notified of the degradation of the optical link in response to the predetermined number of the diagnosis packets being dropped.

5. The apparatus of claim 1, wherein:
the diagnosis packets are first diagnosis packets;
the modifications to the first diagnosis packets include changing a field of a copy of the first diagnosis packets indicating the degradation of the optical link to generate second diagnosis packets; and
the processor is configured to send the second diagnosis packets to the router such that the router is notified of the degradation of the optical link in response to identifying the field of the second diagnosis packets being changed.

6. The apparatus of claim 1, wherein the electrical interface is an Ethernet interface.

7. The apparatus of claim 1, wherein the processor is configured to not interrupt data traffic transmitted via the plurality of optical links.

8. The apparatus of claim 1, wherein the processor is configured to identify the degradation of the optical link in response to a pre-FEC BER value meeting a criteria.

9. The apparatus of claim 1, wherein the processor is configured to make the modifications to the diagnosis packets transmitted via the optical link in response to a pre-FEC BER value meeting a criteria and a pre-determined period of time.

10. The apparatus of claim 1, wherein:
the optical link is a first optical link;
the processor is configured to make the modifications to the diagnosis packets designated to be transmitted via the first optical link such that the router reroutes data traffic to be transmitted via a second optical link of the plurality of optical links, the second optical link being different from the first optical link.

11. The apparatus of claim 1, wherein the optical transponder is configured to be located separately from the router.

12. The apparatus of claim 1, wherein the processor is configured to not send a control signal to the router in response to the degradation of the optical link being identified.

13. The apparatus of claim 1, wherein the diagnosis packets are Ethernet Operations, Administration, and Maintenance (E-OAM) packets.

14. An apparatus, comprising:
a memory; and
a processor operatively coupled to the memory, the processor configured to be operatively coupled to a first optical transponder, the first optical transponder configured to be operatively coupled to a second optical transponder via a plurality of optical links, the second optical transponder configured to be operatively coupled to a remote router,
the processor configured to send first data packets and diagnosis packets to the first optical transponder such that the first optical transponder transmits the data packets to the remote router via the plurality of optical links and the second optical transponder,
the processor configured to receive a signal from the remote router via the first optical transponder and the second optical transponder, in response to the second optical transponder (1) identifying, via pre-forward error correction (FEC) bit error rate detection, a degradation of a first optical link from the plurality of optical links, and (2) dropping a subset of the diagnosis packets,
the processor configured to reroute second data packets in response to the signal such that the remote router receives the second data packets via a second optical link from the plurality of optical links.

15. The apparatus of claim 14, wherein the diagnosis packets are Ethernet Operations, Administration, and Maintenance (E-OAM) packets.

16. The apparatus of claim 14, wherein the processor is configured to be located separately from the first optical transponder.

17. A non-transitory processor-readable medium storing code representing instructions to be executed by a processor, the code comprising code to cause the processor to:
receive, at an optical transponder, data packets and diagnosis packets via an optical link from a plurality of optical links;
perform pre-forward error correction (FEC) bit error rate (BER) detection to identify a degradation of the optical link from the plurality of optical links;
drop a subset of the diagnosis packets in response to the identifying of the degradation of the optical link; and send the data packets without the subset of the diagnosis packets to a router to be operatively coupled to the optical transponder to notify the router of the degradation of the optical link in response to the dropping of the subset of the diagnosis packets.

18. The non-transitory processor-readable medium of claim 17, wherein the diagnosis packets are bidirectional forwarding detection (BFD) packets.

19. The non-transitory processor-readable medium of claim 17, wherein the code comprises code to cause the processor to identify the degradation of the optical link in response to a pre-FEC BER value meeting a criteria.

20. The non-transitory processor-readable medium of claim 17, wherein the code comprises code to cause the processor to drop the subset of the diagnosis packets in response to a pre-FEC BER value meeting a criteria and a pre-determined period of time.

* * * * *